United States Patent
Bloomfield et al.

(10) Patent No.: US 6,241,372 B1
(45) Date of Patent: Jun. 5, 2001

(54) ONE PIECE MOLDED COMPONENT HIGH MOUNTED STOP LAMP

(75) Inventors: Richard M. Bloomfield, Auburn Hills; Deval Desai; Ronald A. Wheat, both of Farmington Hills, all of MI (US)

(73) Assignee: North American Lighting, Inc., Farmington Hills, MI (US)

( * ) Notice: Subject to any disclaimer, the term of this patent is extended or adjusted under 35 U.S.C. 154(b) by 0 days.

(21) Appl. No.: 09/339,078

(22) Filed: Jun. 23, 1999

(51) Int. Cl.[7] ................................................. F21W 101/02
(52) U.S. Cl. ........................... 362/541; 362/544; 362/546
(58) Field of Search ..................... 362/505, 544, 362/520, 546, 548, 374, 375, 541

(56) References Cited

U.S. PATENT DOCUMENTS

| | | | | |
|---|---|---|---|---|
| 728,789 | * | 5/1903 | Wellman | 362/548 X |
| 1,074,537 | * | 9/1913 | Obeles | 362/544 |
| 1,286,170 | * | 11/1918 | Cook | 362/520 X |
| 2,587,807 | * | 3/1952 | Arenberg et al. | 362/520 X |

* cited by examiner

*Primary Examiner*—Laura K. Tso
(74) *Attorney, Agent, or Firm*—McDonnell Boehnen Hulbert & Berghoff; Thomas E. Wettermann

(57) ABSTRACT

A one piece molded vehicle lamp includes a housing portion, a lens portion, and a hinge connecting the housing portion to the lens portion. At least one connector secures the lens portion to the housing portion. A bulb is located on an inside of the housing portion. Light emanating from the bulb reflects light from the bulb outward through the lens portion.

15 Claims, 1 Drawing Sheet

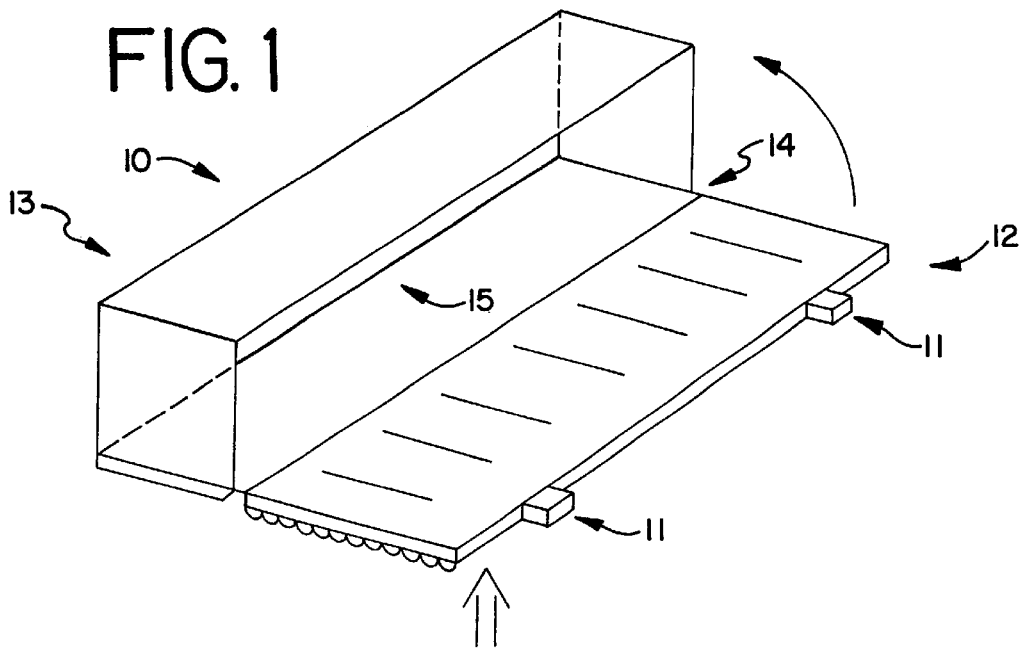
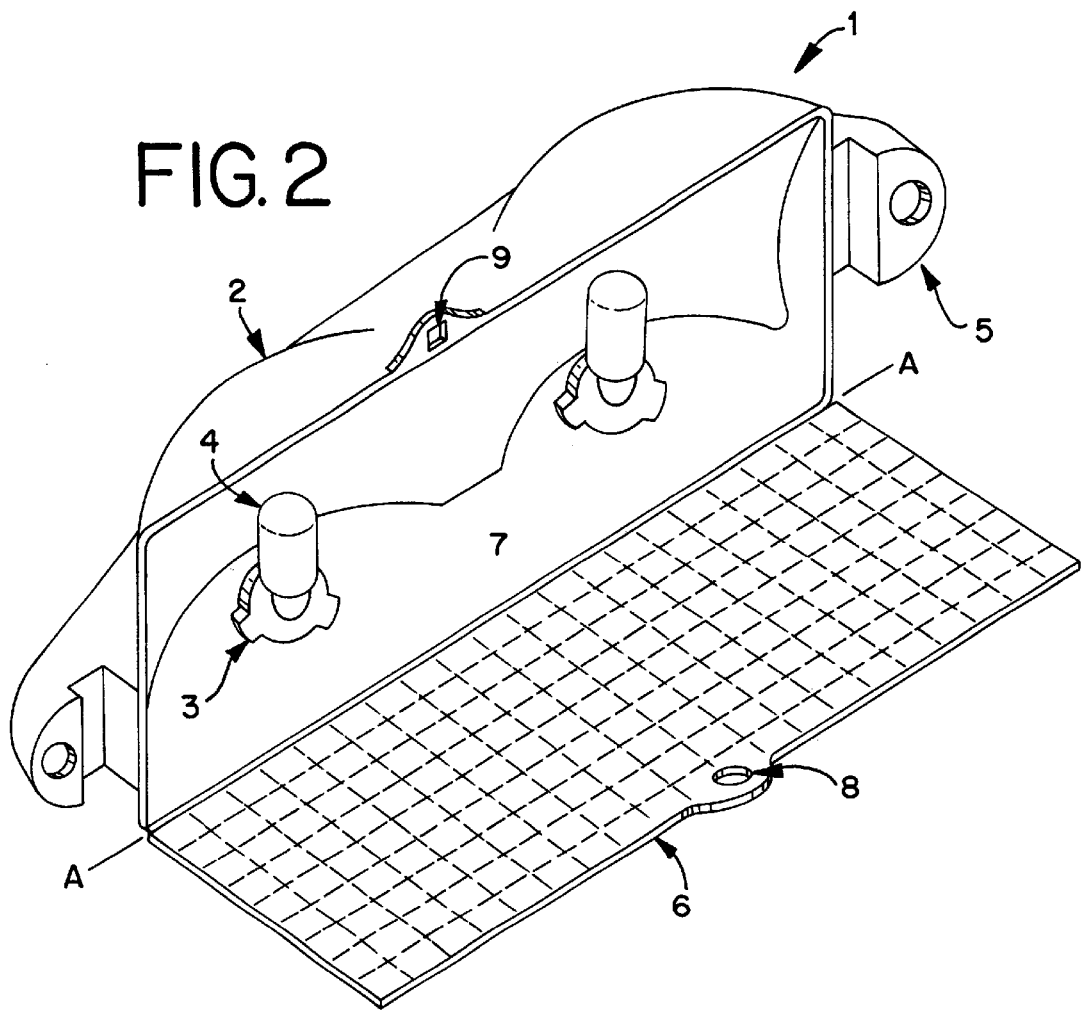

ONE PIECE MOLDED COMPONENT HIGH MOUNTED STOP LAMP

FIELD OF INVENTION

This invention relates to the field of automobile lamp assemblies, and in particular, to a one-piece molded high mounted stop lamp assembly.

BACKGROUND OF THE INVENTION

High mounted stop lamps ("HMSL") have been a requirement in this country for several years. Automobile manufacturers have provided various types of lamp assemblies to meet this requirement.

A conventional high mounted stop lamp consists of a housing with a reflective coating on the inside and a lens mounted thereto with a bulb inside. While this type of lamp assembly may come in various shapes and sizes, many of these assemblies require several components to be connected together, including in addition to the lens and housing, a separate bracket to facilitate the attachment of the bulb socket. A disadvantage of these structures is the high tooling and lamp costs, as well as the difficulty of assembly and the length of manufacturing time. Other indirect consequences of these designs include high left-over scrap and added vehicle weight.

SUMMARY OF THE INVENTION

In one aspect of the present invention, a one piece molded vehicle lamp includes a a housing portion, a lens portion, and a hinge connecting the housing portion to said lens portion. At least one connector is used to secure the lens portion to the housing portion. A bulb is located on an inside of the housing portion, wherein light emanating from the bulb reflects light from the bulb outward through the lens portion.

In another aspect of the present invention, a molded high mounted stop lamp includes a housing portion having a parabolic shaped interior. The stop lamp also includes a bulb is mounted in the interior, a reflective finish, and a lens portion. A living hinge connects the housing portion to the lens portion, such that the reflective finish reflects light from the bulb through the lens portion.

DETAILED DESCRIPTION OF PREFERRED EMBODIMENTS

The present invention represents an improvement over prior high mounted stop lamps in that it is constructed from a one piece body molded from a plastic material. The one piece body is formed from a transparent plastic material and comprises a housing portion with a reflective finish and a lens portion. The body is folded along a living hinge, connecting the lens portion like a lid to the housing portion, forming a box-like structure.

Preferably, the body is molded out of a transparent plastic material. In this manner, the lens portion of the body is pre-made to allow light from a bulb located inside the housing portion to emanate therethrough. The reflective finish is applied directly to the housing portion of the body, preferably on the inside surface thereof, but not the lens portion. In this manner, in use, the interior surface of the housing can reflect light from the bulb outward through the transparent lens portion.

The one piece body may also be molded with additional components. For example, means for securing that unsecured end of the lens portion to the housing portion can be provided, i.e., the lens portion can be molded with a snap member and housing portion can be molded with a corresponding hole in which the snap member can be inserted. In this manner, after the body is molded and the finish is applied, the lens portion is simply folded over along the living hinge and snapped to the housing portion.

Also, one or more openings can be molded in the housing portion to allow bulb members to be inserted and attached therein. Mounting tabs may also be molded on the exterior of the housing portion which can be used to mount the body to the automobile. The body may also be molded in virtually any shape, including having a portion of the housing behind the light source in the shape of a parabola, for reflecting and directing the light outward through the lens portion.

The present invention makes manufacturing and assembly easy and lower in cost in relation to prior devices. Once the body is molded and the reflective finish is applied to the housing portion, the lens portion is simply folded toward the housing portion and snapped together. The steps needed to install a separate lens onto the housing and secure other components thereto are substantially eliminated.

FIGS. 1 and 2 show two embodiments of the present invention.

FIG. 1 shows a body 10 in the shape of a rectangular box with a housing portion 13 and lens portion 12 connected by a living hinge 14, wherein two separate connectors 11 are used to secure the lens portion 12 of the box to the housing portion 13. A reflective finish 15 is provided on the inside of the housing portion 13.

FIG. 2 shows an embodiment having a body 1 with a housing portion 2 and lens portion 6, wherein the back surface of the housing portion 2 is in the shape of two parabolas. This shape makes for efficient reflection of light emanating from the bulb 4 outward through the lens portion 6. Mounting tabs 5 extend from either side of the body for mounting the body to the automobile. A single snap 8 is provided on the inside edge of the lens portion 6 which can be inserted into a corresponding hole 9 molded in place on the housing portion 2. It should be understood that the reverse construction can be used as well. Line AA represents the axis of the living hinge which separates the housing portion 2 from the lens portion 6. Holes 3 are provided for bulbs 4. A reflective finish 7 is provided on the inside of the housing portion 2, but not on the lens portion 6.

We claim:

1. A one piece molded high mounted stop lamp comprising:
   a housing portion;
   a lens portion;
   a hinge connecting said housing portion to said lens portion;
   at least one connector used to secure said lens portion to said housing portion; and
   a bulb located on an inside of said housing portion;
   wherein said housing portion, said lens portion, and said hinge are integrally molded and light emanating from said bulb reflects from the bulb outward through the lens portion.

2. The invention of claim 1 wherein the housing portion is formed from a transparent plastic material.

3. The invention of claim 2 wherein said transparent plastic material is lightweight.

4. The insertion of claim 1 further comprising a reflective finish provided on said inside of said housing portion.

5. The invention of claim 1 further comprising a means for securing said housing portion to said lens portion.

6. The invention of claim 5 wherein said securing means is provided on said lens portion.

7. The invention of claim 1 wherein said housing portion includes an opening for allowing bulb members to be affixed on said inside of said housing portion.

8. The invention of claim 1 wherein said vehicle lamp is a vehicle stop lamp.

9. The invention of claim 1 further comprising a mounting means for mounting said vehicle lamp on a vehicle.

10. A one piece molded high mounted stop lamp comprising:
    a housing portion having a parabolic shaped interior;
    a bulb mounted in said interior;
    a reflective finish;
    a lens portion interal to said housing portion; and
    a living hinge integral to said housing portion and connecting said housing portion to said lens portion; such that said reflective finish reflects light from said bulb through said lens portion.

11. The invention of claim 10 further comprising:
    mounting tabs extending from a first side and from a second side of said housing portion, such that the housing portion may be rigidly affixed to a vehicle.

12. The invention of claim 10 further comprising:
    a snap means provided on an inside edge of said lens portion for inserting said snap means into a corresponding hole on said housing portion.

13. The invention of claim 10 wherein said housing portion includes at least one cavity for mounting said bulb.

14. The invention of claim 10 wherein said housing portion is a lightweight, transparent material.

15. The invention of claim 10 wherein the housing portion is a rectangular-like structure.

* * * * *